(12) United States Patent
Shah

(10) Patent No.: US 6,619,751 B1
(45) Date of Patent: Sep. 16, 2003

(54) HEAT RESTRAINT FOR A PASSENGER OF A VEHICLE

(76) Inventor: Mrugesh K. Shah, 403 Trails Ct., Houston, TX (US) 77024

(*) Notice: Subject to any disclaimer, the term of this patent is extended or adjusted under 35 U.S.C. 154(b) by 0 days.

(21) Appl. No.: 10/094,387

(22) Filed: Mar. 11, 2002

Related U.S. Application Data

(63) Continuation-in-part of application No. 09/963,327, filed on Sep. 27, 2001.

(51) Int. Cl.[7] .......................... B60N 2/42; B60R 21/00; A42B 3/00; A42B 3/10; F41H 1/04
(52) U.S. Cl. .................. 297/464; 297/480; 297/216.12; 2/410; 2/411; 2/412; 2/414; 2/6.1; 2/6.2; 2/6.8
(58) Field of Search .......................... 297/216.12, 480, 297/487, 393, 464; 2/410, 411, 412, 414, 6.1, 6.2, 6.6, 6.8

(56) References Cited

U.S. PATENT DOCUMENTS

| | | | | |
|---|---|---|---|---|
| 2,638,293 A | * | 5/1953 | Lindstrom | 297/480 |
| 3,030,627 A | * | 4/1962 | Rehman et al. | 2/6.2 |
| 3,170,659 A | * | 2/1965 | Wood, Jr. | 297/216.12 X |
| 3,665,514 A | * | 5/1972 | Durand | 2/6.6 X |
| 3,992,721 A | * | 11/1976 | Morton | 2/414 X |
| 4,472,472 A | * | 9/1984 | Schultz | 2/410 X |
| 4,664,341 A | * | 5/1987 | Cummings | 297/464 X |
| 4,923,147 A | * | 5/1990 | Adams et al. | 2/464 X |
| 5,444,870 A | * | 8/1995 | Pinsen | 2/411 X |
| 5,669,079 A | * | 9/1997 | Morgan | 2/412 X |
| 6,305,028 B1 | * | 10/2001 | Lin | 2/410 |
| 2001/0002087 A1 | * | 5/2001 | Townsend | 297/480 X |
| 2001/0032351 A1 | * | 10/2001 | Nakayama et al. | 2/411 X |
| 2002/0043831 A1 | * | 4/2002 | Alsup | 297/216.12 |

* cited by examiner

Primary Examiner—Rodney B. White
(74) Attorney, Agent, or Firm—Harrison & Egbert

(57) ABSTRACT

A head restraint for a passenger of a vehicle including a seat having a seat back, a helmet pivotally secured to the seat back, and an inertia harness mechanism connected to the helmet. The helmet has an interior suitable for receiving a human head therein. In particular, the helmet has a plurality of bar members extending in transverse relationship to each other and have a curvature generally conforming to a curvature of a portion of the human head. The inertia harness mechanism is suitable for restricting relative movement of the helmet upon application of forces beyond a desired level to the vehicle. Pad members are secured to the ends of the each of the bar members so as to generally face the human head received within the helmet.

18 Claims, 3 Drawing Sheets

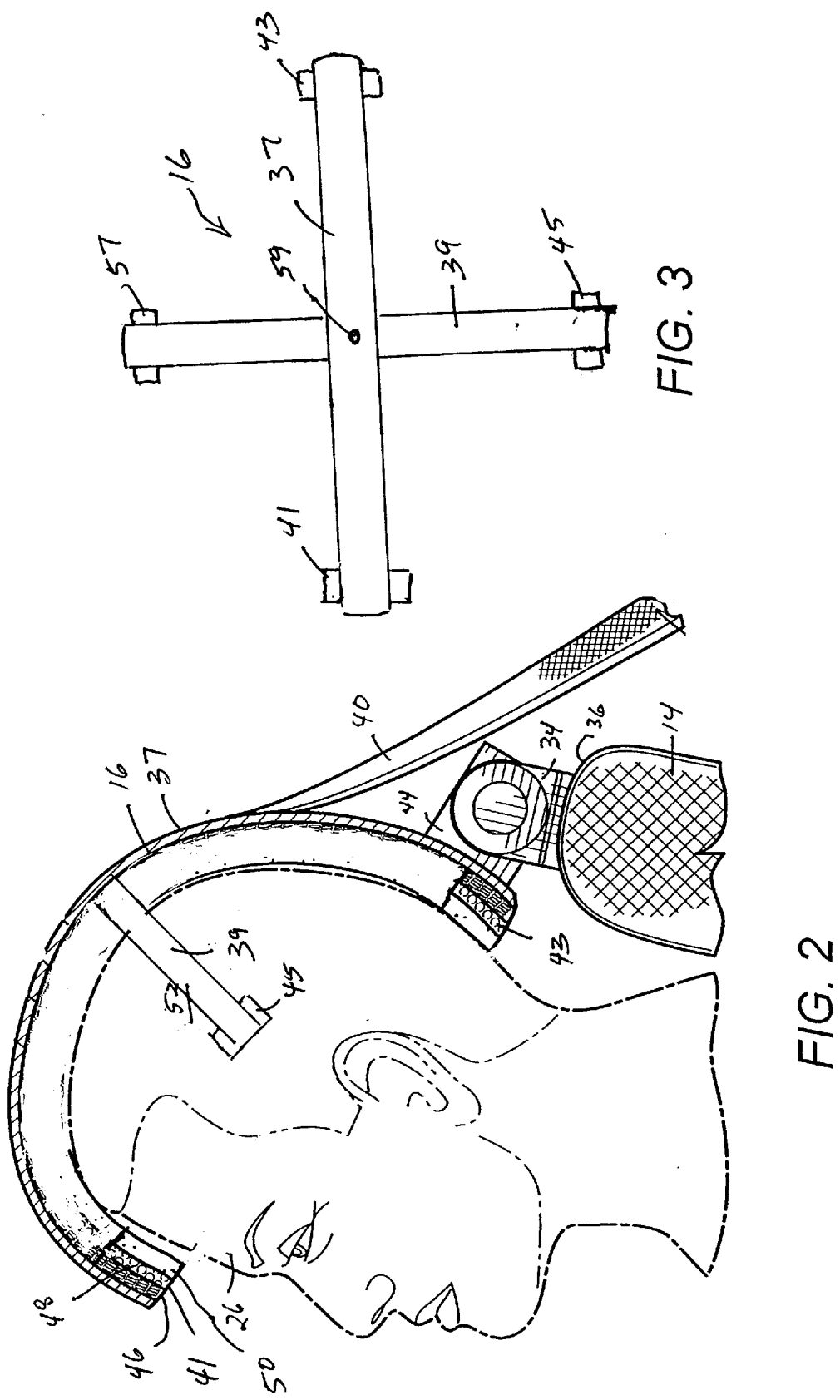

HEAT RESTRAINT FOR A PASSENGER OF A VEHICLE

CROSS REFERENCE TO RELATED APPLICATIONS

The present application is a continuation-in-part of U.S. patent application Ser. No. 09/963,327, filed on Sep. 27, 2001, and entitled "HEAD RESTRAINT FOR A PASSENGER OF A VEHICLE", presently pending.

BACKGROUND OF THE INVENTION

1. Field of the Invention

The present invention relates to a device which is adapted to protect a passenger's head in a motor vehicle in the case of impact, especially frontal collisions. More particularly, the present invention relates to helmet-type devices which are secured to the vehicle for the purpose of protecting and cushioning any blows to the human head caused by collisions.

2. Description of Related Art

A number of devices have been suggested heretofore to prevent or at least to reduce the damages ensuing to the passengers of a motor vehicle in the case of an accident. These include devices of different kinds, such as padding the vehicle interior, pneumatic cushions which automatically inflate at the time of impact, and seat belts permanently in position in the sense that after the initial fastening operation they remain in active position as long as the passengers are in the interior of the vehicle.

Such devices are also used in combination when the devices of a single type do not solve the problem of passenger protection in a satisfactory manner. For example, the seat belt devices have the advantage of not being as bulky as padding while simultaneously providing safety to the passenger in the vehicle. Seat belts require only the initial (manual) fastening operation and there is no risk of failure as, conversely, may happen with pneumatic cushions (e.g. in the case of defects in the inflation apparatus). The seat belts only offer protection which is limited to only a few parts of the passenger's body and, in the majority of the cases, the head, in particular, is excluded from the protection.

Statistical findings on accidents, in laboratory tests carried out to simulate the accidents, have shown that seat belts, for example, lap and shoulder belts, afford good protection until the velocity at impact is not too high. If, conversely, the velocity is high, while the passenger's body is firmly held on the seat, the head is subjected to a movement which is neither controlled nor braked and which causes stresses on the head which are above the tolerability threshold. For these reasons, there is a need for a protection system which is based on the use of safety belts capable of protecting in the case of impact, the passenger's body, more particularly, the trunk, and a device, cooperating with the belts, and especially provided for the protection of the head.

In the past, various U.S. patents have issued relating to devices for protecting the passenger's head. For example, U.S. Pat. No. 3,953,049, issued on Apr. 27, 1976 to Surace et al., describes an inflatable head protector adapted for protecting the passenger's head in the case of collision. The safety device comprises a protective strip which unfolds itself in a spatial form generated by rotation of a U-shaped line about an axis passing through the ends of the U-shaped line. The axis is horizontal and transverse with respect to the vehicle and is at the level of the head, behind the head. At the instant of impact, the strap is inflated by a pressurized gas and is unfolded so as to become positioned in front of the passenger's head.

U.S. Pat. No. 3,753,576, issued on Aug. 21, 1973 to J. F. Gorman, describes a vehicle safety device comprising an expandable composite element provided with a mounting for location in a vehicle and which is expandable from an inoperative retracted position to an operative expanded position. There is a means for rapidly filling the element with a filler material so as to cause the expansion. The element includes an outer shield which expands first and an inner shield which extends inwardly therefrom. The shield extends over the human head and across the torso of the human body.

U.S. Pat. No. 4,909,459, issued on Mar. 20, 1990 to M. H. Patterson, describes a helmet-mounted head restraint which restrains the forward and downward movement of the occupant's head when subjected to large deceleration forces. The restraint includes a strap assembly which encircles the back of the occupant's head and releasably connects to the helmet adjacent to each of the passenger's ears. A restraining strap is slidably connected by a loop to the strap assembly and extends behind the head through a retracting means fixed in the seat. The retracting means pulls the head back against the seat when deceleration forces exceed a predetermined level. The device is particularly designed for aircraft operations.

U.S. Pat. No. 3,795,412, issued on Mar. 5, 1974 to A. E. John, describes a vehicle safety device having a roof housing for storing a plurality of inflatable, spaced apart tubes carrying a sleeve of netting material adapted to surround and confine the occupants upon deployment. The netting and inflated tubes are positioned around the occupants and the back of the seat to restrain the occupants from forward and lateral movement.

In the past, various helmets have been designed for the protection of the head during physical activity. For example, U.S. Pat. No. 5,586,200, issued on May 6, 1986 to M. C. Poon, describes a crash helmet having a plurality of protective layers. One of the protective layers includes inflatable air bubbles whose pressure and size may vary when connected to an outside air pressure supply. U.S. Pat. No. 5,444,870, issued on Aug. 29, 1995 to D. Pinsen, describes a football helmet and shoulder pad combination. The helmet portion is resiliently coupled to the shoulder pad. U.S. Pat. No. 4,354,284, issued on Oct. 19, 1982 to E. R. Gooding, describes a protective liner for outdoor headgear in which a plurality of fluid-filled cushions have walls of resilient material joined together in a regular and spaced relationship around the interior of the headgear. The cushions are interconnected by fluid-carrying passages so as to facilitate the dispersing of the impact forces laterally. U.S. Pat. No. 5,685,021, issued on Nov. 11, 1997 to K. Tsujino, describes a protective wrestling headgear having a layer of gel cushioning material, preferably silicon gel, covering the interior surface.

The present inventor is the inventor of U.S. patent application Ser. No. 09/963,327, filed on Sep. 27, 2001. In particular, this patent application describes a head restraint for a passenger of a vehicle. The head restraint includes a seat with a seat back, a helmet pivotally secured to the seat back and having an interior suitable for receiving a human head therein, and an inertia harness connected to the helmet for restricting relative movement of the helmet upon the application of forces beyond a desired level to the vehicle. A universal joint is secured the helmet to the seat back. The helmet includes a rigid outer shell, a resilient member layer affixed to an interior surface of the outer shell, a packing layer affixed to an interior surface of the resilient member layer, and a pliable layer affixed to an interior surface of the packing layer. The resilient member layer includes a plurality of springs. The packing layer includes a bubble wrap material or a plurality of randomly disposed foam elements. This application describes a helmet having a great deal of coverage of the human head. Upon reflection, it was decided that the person wearing the helmet may desire to have his or her head covered with less material. Additionally, the user of the vehicle may desire to be able to stow the helmet in an easy and convenient manner. As such, the present application was developed so as to address such issues. It is an object of the present invention to provide a head restraint for a passenger of a vehicle which effectively prevents head injuries from occurring.

It is a further object of the present invention to provide a head restraint which allows normal movement within the vehicle while preventing movement of the head during the application of strong deceleration forces to the vehicle.

It is a further object of the present invention to provide a head restraint which will fit comfortably over the human head.

It is another object of the present invention to provide a head restraint which is easy to use, relatively inexpensive and easy to manufacture.

These and other objects and advantages of the present invention will become apparent from a reading of the attached specification and appended claims.

BRIEF SUMMARY OF THE INVENTION

The present invention is a head restraint for a passenger of a vehicle comprising a seat, a helmet pivotally secured to the seat back of the seat and having an interior suitable for receiving a human head therein, and an inertia harness means connected to the helmet for restricting relative movement of the helmet upon application of deceleration forces beyond a desired level.

In particular, the helmet of the present invention comprises a plurality of bars extending in transverse relationship to each other and having a curvature suitable for conforming to a curvature of a portion of the human head. In particular, one of the bars is pivotally connected to the other bar and upon deployment will extend transverse to the other bar. Each of the first and second bars has a pad member at an end thereof.

A universal joint secures the helmet to the top surface of the seat back. The helmet is connected to this universal joint. In one embodiment of the present invention, a third bar can extend from the universal joint below the first and second bar so as to be in close proximity to the jaw of the passenger. This third bar will have a pad member at an end thereof generally facing the jaw of the wearer.

Each of the bars has a relatively rigid configuration. The pad member is affixed to an interior surface of such bars. Each of the pad members includes a resilient member layer affixed to an interior surface of the bar, a packing layer affixed to an interior surface of the resilient member layer, and a pliable layer affixed to an interior surface of the packing layer. The pliable layer is directly facing the human head. The resilient member layer includes a plurality of springs interposed between the outer shell and the packing layer. Each of the plurality of springs has one end secured to the interior surface of the bar and an opposite end secured to the packing layer. The packing layer can either be a bubble wrap material or a plurality of randomly disposed foam elements. The pliable layer is a silicone material applied to the interior surface of the packing layer.

The inertia harness mechanism comprises a belt affixed to the helmet and extending rearwardly of the seat back, and a retraction mechanism cooperative with the belt and positioned rearwardly of the seat back. The retraction mechanism limits forward movement of the helmet upon application of deceleration forces by the vehicle.

BRIEF DESCRIPTION OF THE SEVERAL VIEWS OF THE DRAWINGS

FIG. 2 is a cross-sectional view of the interior of the helmet as used in the head restraint apparatus of the present invention.

FIG. 3 is a plan view of the isolated helmet in accordance with the teachings of the present invention.

DETAILED DESCRIPTION OF THE INVENTION

Figure 1:
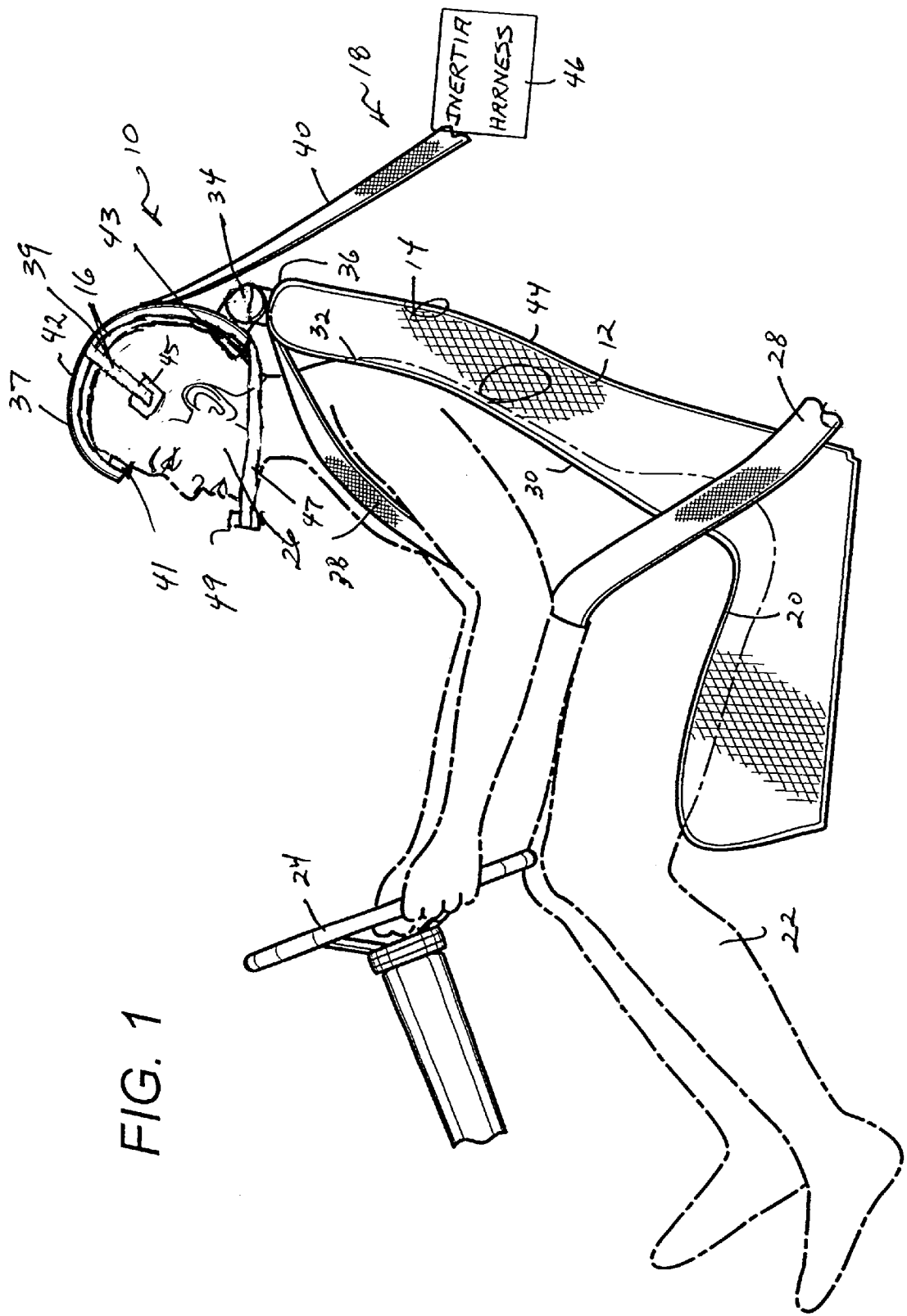
FIG. 1 is a side elevational and partially diagrammatic illustration of the head restraint apparatus of the present invention.

Referring to FIG. 1, there is shown the head restraint system 10 in accordance with the teachings of the present invention. The head restraint system 10 includes a seat 12 having a seat back, a helmet 16 pivotally secured to the seat back, and an inertia harness 18 connected to the helmet 16 so as to restrict relative movement of the helmet 16 upon the application of deceleration forces beyond a desired level to the vehicle in which the seat 12 is placed.

In FIG. 1, it can be seen that the seat 12 includes a sitting portion upon which the driver 22 is positioned. The driver 22 is illustrated in a driving position holding the steering wheel 24. The head 26 of the driver 22 is positioned within the helmet 16. A conventional seat belt 28 extends around the waist of the driver 22 above the sitting portion 20 of seat 12. The driver 22 is positioned so as to have his or her back 30 resting against the interior surface 32 of the seat back 14.

A universal joint 34 is connected to the helmet 16 and to the top surface 36 of the seat back 14. This universal joint 34 will allow the helmet 16 to move up-and-down and side-to-side in a manner so that the driver 22 can turn his or her head as desired or move his or her head upwardly and downwardly as desired. A shoulder harness 34 will extend downwardly from the top 36 of the seat back 14 and across the chest of the driver 22 so as to secure the driver 22 in a properly restrained position. In normal use, the helmet 16 can be lifted upwardly and downwardly so that the interior surface of the helmet 16 will receive the human head 26 therein.

As can be seen in FIG. 1, the helmet 16 includes a first bar 37 and a second bar 39. The first bar 37 is connected to the belt 40 and to the universal joint 34. The first bar 37 has a curvature generally corresponding to the curvature of the human head 26 from the back of the human head to the forehead. A pad member 41 is affixed to the first bar 37 at one end of the interior surface of the first bar 37. A second pad member 43 is affixed to the interior surface of the first bar 37 at an opposite end from the pad member 41.

The second bar 39 extends transverse to the first bar 37. The second bar 39 has a curvature generally corresponding to the curvature of the human head 26 from the area on the side of the head to the other side of the head. A pad member 45 is affixed to an end of the second bar 39. Another pad member, such as pad member 45, will be affixed to the opposite end of the second bar member 39. A third bar member 47 is connected to either the end of the first bar 37, to universal joint 34 or to the inertia harness mechanism 18. Third bar 47 extends below the first bar 37 and the second bar 39. The third bar 47 will extend so as to have an end adjacent to the jaw of the head 26. A pad member 49 is affixed to the interior surface of the end of the bar 47 so as to face the jaw of the human head 26.

Belt 40 is connected to the first bar 37 of the helmet 16. The belt 40 extends rearwardly beyond the back 44 of the seat back 14. A retraction mechanism 46 is positioned rearwardly of the seat back 44 and receives the opposite end of the belt 40 from the helmet 16. The inertia harness mechanism 46 operates similar to the inertia harnesses used for the seat belt 28 and/or the shoulder harness 38. The inertia harness mechanism 46 will allow relative upward-and-downward or side-to-side movement of the head 26 until strong deceleration forces are applied to the vehicle, such as in the event of an accident. At such time, the inertia harness mechanism 46 will serve to lock the belt 40 so as to prevent pivotal or side-to-side movement of the helmet 16. As a result, the head 26 of the driver 22 will be properly restrained. The head restraint apparatus 10 prevents the head 26 from snapping forward and causing concussion injuries. By retaining the head 26 in a properly fixed position and by providing a cushioning material within the rigid shell 42 of the helmet 16, injuries to the head 26 are effectively prevented by the system 10 of the present invention. The present invention will prevent the head 26 from ever encountering the surface of the steering wheel 24 or the dashboard in the event of an accident.

FIG. 2 shows an interior view of the helmet 16 of the present invention. In FIG. 2, it can be seen that the belt 40 is affixed to the first bar 37 of helmet 16. An arm 44 is also connected to the exterior surface of the first bar 37 and extends rearwardly to the universal joint 34. Universal joint 34 is shown as affixed to the top surface 36 of the seat back 14. Various configurations of universal joints 34 can be made within the scope of the present invention. It is important that the universal joint 34 be capable of allowing side-to-side pivotal movements of the helmet 16 and upward-and-downward movements of the helmet 16.

In FIG. 2, it can be seen that the helmet 16 has first bar 37 and second bar 39. First pad member 41 is affixed to the interior surface of the first bar 37. Another pad member 43 is affixed to the interior surface of the bar 37 opposite to the pad member 41. Similarly, pad member 45 is affixed to the interior surface of the transverse bar 39. Each of the pad members 41, 43 and 45 includes a resilient member layer 46 to the interior surface of the respective bar members. A packing layer 48 extends against the interior surface of the resilient member layer 46. A pliable layer 50 is affixed so as to extend along the interior surface of the packing layer 48. As can be seen, the skull 52 of the head 26 will reside so as to generally face the pliable layer 50 on each of the pad members 41, 43 and 45. The use of the pliable layer 50 allows the helmet 16 to conveniently, comfortably and securely receive the skull 52 of head 26.

With reference to FIG. 2, the resilient member layer 46 comprises a plurality of springs interposed between the interior surface of the respective bars and the packing layer 48. Each of the plurality of springs which makes up the resilient member layer 46 has one end secured to the interior surface of the respective bars and an opposite end secured to the packing layer 48. These springs 46 will serve to cushion any impact caused by the compression of the human head 26 against the rigid outer shell 42.

The packing layer 48 can comprise a bubble wrap material interposed between the pliable layer 50 and the resilient member layer 46. Alternatively, the packing layer 48 can comprise a plurality of foam elements, such as foam peanuts, randomly disposed between the resilient member layer 46 and the pliable layer 50. The pliable layer 50 is a silicone material extending across the interior surface of the packing layer 48. It has been found that this configuration of various layers effectively cushions any impact caused by the forward movement of the head 26 during the application of strong deceleration forces, such as during an accident.

FIG. 3 is a plan view showing the configuration of the helmet 16. As can be seen, there is a first bar 37 having a first pad member 41 at one end and a second pad member 43 at an opposite end. The second bar member 39 extends transverse to the first bar member 37. The second bar member 39 includes a first pad 45 at one end and a second pad 57 at an opposite end. A pivot joint 59 can connect the first bar member 37 with the second bar member 39 so that the second bar member 39 can pivot with respect to the first bar member 37 and nest therewithin.

Figure 4:
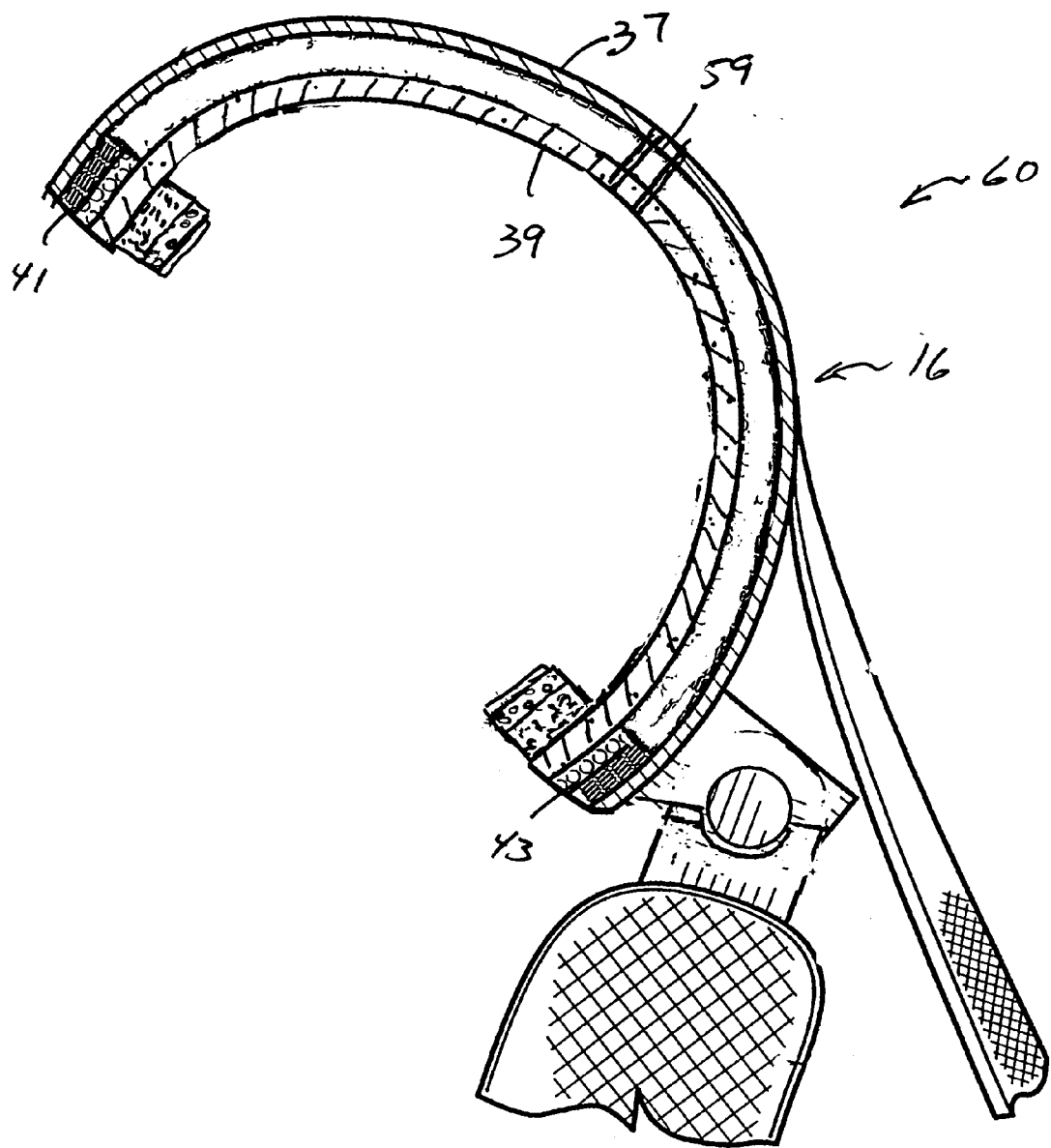
FIG. 4 is a side elevational view showing one of the bars as nested within the other bar.

FIG. 4 shows the nesting relationship of the first bar member 37 with respect to the second bar member 39. Pivot joint 59 is particularly illustrated in FIG. 4 so that one of the bar members can rotate with respect to the other bar member. During use and stowage, the helmet 16 of the present invention can be rotated so that the first bar member 37 nestably receives the second bar member 39. The helmet 16 can then be pivoted backwardly for further stowage. The arrangement of the pad members 41 and 43 of the first bar 37 will serve to provide a secure nesting relationship between the respective bar members.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A head restraint for a passenger of a vehicle comprising:
   a seat having a seat back;
   a helmet pivotally secured to said seat back, said helmet having an interior for receiving a human head therein, said helmet comprising a plurality of bar members;
   an inertia harness means connected to said helmet, said inertia harness means for restricting relative movement of said helmet upon application of forces beyond a desired level to the vehicle, and
   a universal joint secured to a top surface of said seat back, said helmet being connected to said universal joint.

2. The head restraint of claim 1, said plurality of bar members comprising:
   a first bar; and
   a second bar extending generally transverse to said first bar, each of said first and second bare having a curvature generally corresponding to a curvature of the human head.

3. The head restraint of claim 2, each of said first and second bars having a pad member affixed thereto.

4. The head restraint of claim 2, further comprising:
   a third bar extending outwardly of said inertia harness means, said third bar having an end in proximity to a jaw of the human head, said third bar positioned below said first and second bars.

5. The head restraint of claim 4, said third bar having a pad member at an end opposite said inertia harness means.

6. The head restraint of claim 1, said inertia harness means comprising:
   a belt affixed to said helmet and extending rearwardly of said seat back; and
   a retraction mechanism cooperative with said belt and positioned rearwardly of said seat back, said retraction mechanism limiting forward movement of said helmet upon the application of braking forces by the vehicle.

7. A head restraint for a passenger of a vehicle comprising:
   a seat having a seat back;
   a helmet pivotally secured to said seat back, said helmet having an interior for receiving a human head therein, said helmet comprising a plurality of bar members, each of said plurality of bar members having a pad member affixed thereto, said pad member comprising:
      a resilient member layer affixed to an interior surface of the bar;
      a packing layer affixed to an interior surface of said resilient member layer; and
      a pliable layer affixed to an interior surface of said packing layer, said pliable layer suitable for facing the human head, and
   an inertia harness means connected to said helmet, said inertia harness means for restricting relative movement of said helmet upon application of forces beyond a desired level to the vehicle.

8. The head restraint of claim 7, said resilient member layer comprising a plurality of springs interposed between said interior surface of the bar and said packing layer.

9. The head restraint of claim 8, each of said plurality of springs having one end secured to said interior surface of the bar and an opposite end secured to said packing layer.

10. The head restraint of claim 7, said packing layer comprising a bubble wrap material interposed between said resilient member layer and said pliable layer.

11. The head restraint of claim 7, said packing layer comprising a plurality of foam elements randomly disposed between said resilient member,layer and said pliable layer.

12. The head restraint of claim 7, said pliable layer comprising a silicone material lined around said interior surface of said packing layer.

13. A helmet for a head restraint apparatus for protecting a passenger of a vehicle comprising:
   a first bar having a curvature corresponding to a curvature of a portion of a human head;
   a second bar having a curvature corresponding to another curvature of the human head, said second bar being connected to the first bar, said second bar being pivotally connected to said first bar such that said second bar is movable between a first position extending transverse to said first bar and a second position nested within said first bar;
   a first pad member affixed to an interior surface of said first bar; and
   a second pad member affixed to an interior surface Of said second bar.

14. The helmet of claim 13, each of said first and second pad members comprising:
   a resilient member layer affixed to an interior surface of the bar;
   a packing layer affixed to an interior surface of said resilient member layer; and
   a pliable layer affixed to an interior surface of said packing layer, said pliable layer suitable for facing the human head.

15. The helmet of claim 14, said resilient member layer comprising a plurality of springs interposed between an interior surface of the bar and said packing layer.

16. The helmet of claim 14, said packing layer comprising a bubble wrap material interposed between said resilient member layer and said pliable layer.

17. The helmet of claim 13, said first pad member affixed to one end of said first bar, said second pad member affixed to one end of said second bar, the helmet further comprising:
   a third pad member affixed to an opposite end of said first bar; and
   a fourth pad member affixed to an opposite end of said second bar.

18. A helmet for a head restraint apparatus for protecting a passenger of a vehicle comprising:
   a first bar having a curvature corresponding to a curvature of a portion of a human head;
   a second bar having a curvature corresponding to another curvature of the human head, said second bar being connected to said first bar and extending transverse thereto;
   a third bar affixed to at least one of said first and second bars and extending outwardly therefrom at a location below said first and second bars;
   a first pad member affixed to an interior surface of said first bar; and
   a second pad member affixed to an interior surface of said second bar.

* * * * *